United States Patent
Ikeno et al.

(10) Patent No.: US 10,738,190 B2
(45) Date of Patent: Aug. 11, 2020

(54) RESIN COMPOSITION CONTAINING SUPPORTED PLATINUM CATALYST, THERMOSETTING ORGANOPOLYSILOXANE COMPOSITION USING THE RESIN COMPOSITION, AND METHOD FOR CURING THE THERMOSETTING ORGANOPOLYSILOXANE COMPOSITION

(71) Applicants: SHIN-ETSU CHEMICAL CO., LTD., Tokyo (JP); NATIONAL INSTITUTE OF ADVANCED INDUSTRIAL SCIENCE AND TECHNOLOGY, Tokyo (JP)

(72) Inventors: Masayuki Ikeno, Maebashi (JP); Takeshi Miyao, Takasaki (JP); Takeharu Toyoshima, Takasaki (JP); Jun-chul Choi, Tsukuba (JP); Norihisa Fukaya, Tsukuba (JP); Hiroyuki Yasuda, Koto-ku (JP)

(73) Assignees: SHIN-ETSU CHEMICAL CO., LTD., Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 141 days.

(21) Appl. No.: 16/086,779

(22) PCT Filed: Feb. 28, 2017

(86) PCT No.: PCT/JP2017/007889
§ 371 (c)(1),
(2) Date: Sep. 20, 2018

(87) PCT Pub. No.: WO2017/169469
PCT Pub. Date: Oct. 5, 2017

(65) Prior Publication Data
US 2019/0100649 A1 Apr. 4, 2019

(30) Foreign Application Priority Data
Mar. 29, 2016 (JP) .................. 2016-065635

(51) Int. Cl.
C08L 83/04 (2006.01)
C08K 9/06 (2006.01)
C08L 101/00 (2006.01)
B01J 31/22 (2006.01)
B01J 31/16 (2006.01)

(52) U.S. Cl.
CPC .......... *C08L 83/04* (2013.01); *B01J 31/1633* (2013.01); *B01J 31/22* (2013.01); *B01J 31/2295* (2013.01); *C08K 9/06* (2013.01); *C08L 101/00* (2013.01); *B01J 2531/828* (2013.01)

(58) Field of Classification Search
None
See application file for complete search history.

(56) References Cited

U.S. PATENT DOCUMENTS

| | | | |
|---|---|---|---|
| 3,188,300 A | 6/1965 | Chalk | |
| 3,445,420 A | 5/1969 | Kookootsedes et al. | |
| 3,699,073 A | 10/1972 | Wada et al. | |
| 3,882,083 A | 5/1975 | Berger et al. | |
| 3,923,705 A | 12/1975 | Smith | |
| 4,061,609 A | 12/1977 | Bobear | |
| 4,481,341 A | 11/1984 | Schlak et al. | |

(Continued)

FOREIGN PATENT DOCUMENTS

| | | |
|---|---|---|
| CN | 1247554 A | 3/2000 |
| EP | 0349898 A2 | 1/1990 |

(Continued)

OTHER PUBLICATIONS

Laurent et al. "From well-defined Pt(II) surface species to the controlled growth of silica supported Pt nanoparticles" Dalton Trans. 2013, 42, 238-248. (Year: 2013).*

(Continued)

*Primary Examiner* — Robert S Loewe
(74) *Attorney, Agent, or Firm* — Oliff PLC

(57) ABSTRACT

A resin composition includes: (a) a supported platinum catalyst having a structure shown by the following general formula (1) in which a platinum complex is supported on a surface of an inorganic oxide; and (b) a thermoplastic matrix resin. The resin composition is usable as an addition-reaction catalyst capable of imparting sufficient storability and quick curability to an addition-reaction curable composition.

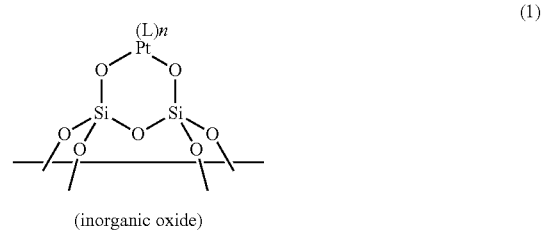

(inorganic oxide)

In the formula, L represents a ligand selected from carbon monoxide, an olefin compound, an amine compound, a phosphine compound, an N-heterocyclic carbene compound, a nitrile compound, and an isocyanide compound; and n represents the number of Ls and an integer from 0 to 2.

19 Claims, No Drawings

(56) References Cited

U.S. PATENT DOCUMENTS

| | | | |
|---|---|---|---|
| 4,766,176 A | 8/1988 | Lee et al. | |
| 4,784,879 A | 11/1988 | Lee et al. | |
| 5,015,716 A | 5/1991 | Togashi et al. | |
| 5,017,654 A | 5/1991 | Togashi et al. | |
| 5,270,424 A * | 12/1993 | Drake | C07F 7/0801 528/15 |
| 5,789,334 A * | 8/1998 | Nakanishi | C08K 9/10 502/159 |
| 5,877,237 A | 3/1999 | Nakanishi et al. | |
| 6,087,523 A * | 7/2000 | Bank | C07F 7/14 556/479 |
| 6,235,861 B1 | 5/2001 | Kishi | |
| 6,433,049 B1 * | 8/2002 | Romenesko | C08L 23/02 524/261 |
| 2009/0286899 A1 * | 11/2009 | Hofmann | B01J 21/063 522/99 |
| 2010/0202950 A1 | 8/2010 | Neverov et al. | |
| 2015/0051357 A1 * | 2/2015 | Komati | C07F 7/0879 525/523 |
| 2015/0246349 A1 | 9/2015 | Sutoh et al. | |
| 2016/0030932 A1 | 2/2016 | Choi et al. | |
| 2017/0226293 A1 * | 8/2017 | Boyer | C08G 77/12 |
| 2017/0309543 A1 * | 10/2017 | Aoki | B32B 9/00 |
| 2018/0186076 A1 * | 7/2018 | Backer | C08G 77/12 |
| 2018/0281276 A1 * | 10/2018 | Milroy | B29C 64/124 |

FOREIGN PATENT DOCUMENTS

| | | |
|---|---|---|
| EP | 0661349 A2 | 7/1995 |
| EP | 2975045 A1 | 1/2016 |
| JP | S53-41707 B2 | 11/1978 |
| JP | S64-45468 A | 2/1989 |
| JP | S64-47442 A | 2/1989 |
| JP | H02-14244 A | 1/1990 |
| JP | H07-196921 A | 8/1995 |
| JP | 2665941 B2 | 10/1997 |
| JP | H11-92662 A | 4/1999 |
| KR | 10-2015-0127215 | 11/2015 |
| TW | 201609977 A | 3/2016 |
| WO | 2014/017671 A1 | 1/2014 |
| WO | 2014/142252 A1 | 9/2014 |

OTHER PUBLICATIONS

Jun. 6, 2017 International Search Report issued in International Patent Application No. PCT/JP2017/007889.

Aug. 17, 2018 Search Report issued in Taiwanese Patent Application No. 106108870.

Mar. 6, 2020 Search Report issued in European Patent Application No. 17774014.9.

May 15, 2020 Office Action issued in Korean Patent Application No. 10-2018-7027736.

* cited by examiner

RESIN COMPOSITION CONTAINING SUPPORTED PLATINUM CATALYST, THERMOSETTING ORGANOPOLYSILOXANE COMPOSITION USING THE RESIN COMPOSITION, AND METHOD FOR CURING THE THERMOSETTING ORGANOPOLYSILOXANE COMPOSITION

TECHNICAL FIELD

The present invention relates to: a resin composition used as a catalyst for an addition-curing reaction between an organopolysiloxane having an alkenyl group and an organohydrogenpolysiloxane having a hydrogen atom bonded to a silicon atom; a thermosetting organopolysiloxane composition using the resin composition; and a method for curing the thermosetting organopolysiloxane composition.

BACKGROUND ART

When an addition-curable organopolysiloxane composition is to be cured, various curing inhibitors are used in order to adjust the curing rate and storability. As such regulators, many compounds have been already proposed. For example, Patent Literature 1 discloses organophosphorus compounds, Patent Literature 2 discloses acetylene alcohols, Patent Literature 3 discloses triallylisocyanurate, Patent Literature 4 discloses hydroxyperoxide, and Patent Literatures 5 and 6 disclose high-vinyl-content siloxanes.

Meanwhile, as a method for controlling storability and curability, for example, Patent Literatures 7 and 8 propose methods for obtaining protected curing catalyst powders by employing processes such as mixing a platinum catalyst with a silicone resin having a softening point of 40 to 200° C. and grinding or spraying the mixture with a spray dryer. Moreover, Patent Literatures 9, 10, and 11, and so on propose microencapsulation techniques for encapsulating a platinum catalyst with a thermoplastic resin.

However, such a platinum catalyst dispersed in a thermoplastic resin so quickly exhibits the catalytic activity through the thermoplastic resin melted during heat curing. For this reason, platinum catalysts soluble in organopolysiloxane compositions have been selected. Hence, in conventional techniques, a platinum catalyst diffuses from the inside of the thermoplastic resin to the inside of the siloxane composition over time, so that long-term storability is not obtained. Meanwhile, Patent Literatures described above also state the use of platinum catalysts supported on alumina, silica, carbon black, and the like. Nevertheless, the platinum catalysts soluble in siloxane compositions are merely adsorbed to the powder surface and not supported on the inorganic powder by covalent bond. Hence, there is a problem that long-term storability cannot be guaranteed for the same reason.

CITATION LIST

Patent Literatures

Patent Literature 1: U.S. Pat. No. 3,188,300
Patent Literature 2: U.S. Pat. No. 3,445,420
Patent Literature 3: U.S. Pat. No. 3,882,083
Patent Literature 4: U.S. Pat. No. 4,061,609
Patent Literature 5: U.S. Pat. No. 3,699,073
Patent Literature 6: U.S. Pat. No. 3,923,705
Patent Literature 7: Japanese Examined Patent Publication (Koukoku) No. Sho 53-41707
Patent Literature 8: Japanese Unexamined Patent Application Publication (Kokai) No. Hei 2-14244
Patent Literature 9: U.S. Pat. No. 4,481,341
Patent Literature 10: Japanese Unexamined Patent Application Publication (Kokai) No. Hei 1-47442
Patent Literature 11: Japanese Unexamined Patent Application Publication (Kokai) No. Hei 1-45468

DISCLOSURE OF INVENTION

Problem to be Solved by the Invention

The present invention has been made in view of the above circumstances. An object of the present invention is to provide a resin composition usable as an addition-reaction catalyst capable of imparting sufficient storability and quick curability to an addition-reaction curable composition.

Means for Solving Problem

To achieve the object, the present invention provides a resin composition comprising:
(a) a supported platinum catalyst having a structure shown by the following general formula (1) in which a platinum complex is supported on a surface of an inorganic oxide; and
(b) a thermoplastic matrix resin.

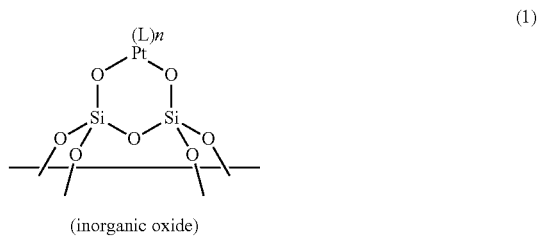

wherein L represents a ligand selected from carbon monoxide, an olefin compound, an amine compound, a phosphine compound, an N-heterocyclic carbene compound, a nitrile compound, and an isocyanide compound; and n represents the number of Ls and an integer from 0 to 2.

Such a resin composition is usable as an addition-reaction catalyst capable of imparting sufficient storability and quick curability to an addition-reaction curable composition.

In this event, the inorganic oxide is preferably silica or a composite oxide containing silicon.

With such an inorganic oxide, a strong covalent bond can be formed between the organic leaving group and the inorganic oxide.

In this event, L in the general formula (1) is preferably cyclooctadiene.

This makes it possible to even further enhance the effects of the present invention.

In this event, the component (b) preferably has a softening point of 40 to 200° C.

Accordingly, the supported platinum catalyst does not diffuse into a thermosetting organopolysiloxane composition, which will be described later, during storage at room temperature, making it possible to prevent curing caused by a hydrosilylation reaction. Additionally, it is possible to prevent an increase in the temperature when the thermosetting organopolysiloxane composition is cured, so that desired curability can be reliably obtained.

Further, in this event, the component (b) is preferably a silicone resin shown by the following average compositional formula (2):

$$R_aSiO_{(4-a)/2} \tag{2}$$

wherein R represents a monovalent organic group, and a represents a number from 1 to 1.8.

This makes it possible to further enhance the effects of the present invention.

In this event, the resin composition is preferably particulate with particle sizes of 0.1 μm to 500 μm.

The inventive resin composition is suitably usable in such a form.

Moreover, the present invention provides a thermosetting organopolysiloxane composition comprising:

(A) an organopolysiloxane containing an alkenyl group bonded to a silicon atom, wherein the number of the alkenyl groups is 0.1 or more per molecule on average;

(B) an organohydrocenpolysiloxane containing at least two hydrogen atoms bonded to silicon atoms per molecule, wherein a blend ratio of (the number of hydrogen atoms bonded to silicon atoms derived from the component (B))/(the number of the alkenyl groups bonded to silicon atoms derived from the component (A)) is 0.4 to 10; and (C) the above-described resin composition, wherein the component (a) contains 1 to 500 ppm of platinum atoms, in terms of weight, relative to a total of the component (A) and the component (B).

Such a thermosetting organopolysiloxane composition is a one-liquid type thermosetting organopolysiloxane composition excellent in long-term storage stability at room temperature.

Further, the present invention provides a method for curing the above-described thermosetting organopolysiloxane composition, the method comprising heating the thermosetting organopolysiloxane composition at a temperature not lower than the softening point of the component (b).

The inventive thermosetting organopolysiloxane composition is curable, for example, by such a method.

Effect of the Invention

As has been described above, the inventive resin composition is usable as an addition-reaction catalyst capable of imparting sufficient storability and quick curability to an addition-reaction curable composition. Moreover, a thermosetting organopolysiloxane composition containing such a resin composition is a one-liquid type thermosetting organopolysiloxane composition excellent in long-term storage stability at room temperature.

BEST MODES FOR CARRYING OUT THE INVENTION

As described above, there has been a desire for a resin composition usable as an addition-reaction catalyst capable of imparting sufficient storability and quick curability to an addition-reaction curable composition.

In order to achieve the above-described object, the present inventors have earnestly studied and consequently found that if a reaction catalyst (curing catalyst) for a thermosetting organopolysiloxane composition is a supported platinum catalyst in which a platinum complex is bonded to a surface of an inorganic oxide by Si—O bonds, when a resin composition containing such a catalyst microencapsulated in a thermoplastic resin (the supported platinum catalyst is dispersed in the thermoplastic resin) is used, abilities to retain the long-term storage stability at room temperature while maintaining the curing rate are imparted to a thermosetting organopolysiloxane composition. This finding has led to the completion of the present invention.

Specifically, the present invention is a resin composition comprising:

(a) a supported platinum catalyst having a structure shown by the following general formula (1) in which a platinum complex is supported on a surface of an inorganic oxide; and (b) a thermoplastic matrix resin.

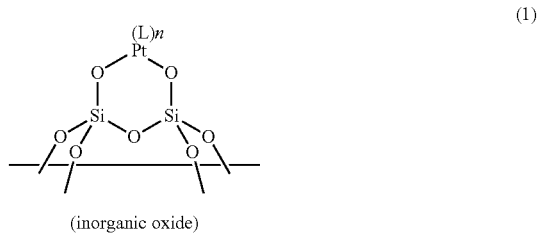

(1)

wherein L represents a ligand selected from carbon monoxide, an olefin compound, an amine compound, a phosphine compound, an N-heterocyclic carbene compound, a nitrile compound, and an isocyanide compound; and n represents the number of Ls and an integer from 0 to 2.

Hereinafter, the present invention will be described in detail, but the present invention is not limited thereto.

[Resin Composition]

The inventive resin composition is a resin composition containing components (a), (b) described below.

<Component (a)>

In the present invention, the component (a) is a supported platinum catalyst having a structure shown by the following general formula (1) in which a platinum complex is supported on a surface of an inorganic oxide.

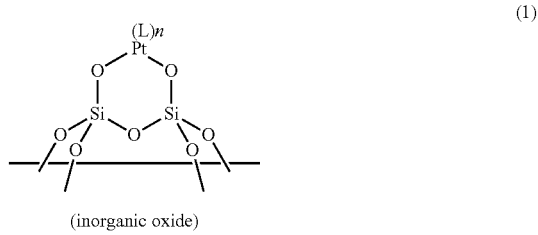

(1)

(In the formula, L represents a ligand selected from carbon monoxide, an olefin compound, an amine compound, a phosphine compound, an N-heterocyclic carbene compound, a nitrile compound, and an isocyanide compound; and n represents the number of Ls and an integer from 0 to 2.)

An example of the preparation method for the component (a) includes the preparation method described in International Publication No. WO2014/142252, but is not limited thereto. The platinum complex in the component (a) is characterized in that the platinum atom is bonded by Si—O bonds to the surface of the inorganic oxide and further supported thereon.

The ligand L is selected from carbon monoxide, an olefin compound, an amine compound, a phosphine compound, an N-heterocyclic carbene compound, a nitrile compound, and an isocyanide compound. The ligand L is particularly desirably an olefin compound. Above all, cyclooctadiene is preferable.

n represents an integer from 0 to 2 indicating the number of the ligands L, and varies depending on the ligand L.

The inorganic oxide is not particularly limited, and it is possible to use: single oxides of silicon, titanium, aluminum, zirconium, magnesium, and the like; composite oxides containing these; or the like. The inorganic oxide is preferably silica or a composite oxide containing silicon. Above all, it is preferable to use precipitated silica, fumed silica, calcined silica, or the like from the viewpoints of containing numerous silanol groups as hydroxyl groups on the surface and enabling formation of a strong covalent bond between the organic leaving group and the inorganic oxide. The composite oxide containing silicon also includes mesoporous silica, aluminosilicate, and the like.

<Component (b)>

Examples of the thermoplastic matrix resin of the component (b) include vinyl-based polymers such as polyethylenes and polystyrenes, condensation polymers such as polyamides and polyesters, organic polymers such as silicone resins, and the like. One of these may be used alone, or two or more thereof may be used in combination. Among these, a silicone resin is preferable. More preferably, the component (b) is a silicone resin shown by the following average compositional formula (2):

$$R_a SiO_{(4-a)/2} \qquad (2)$$

(in the formula, R represents a monovalent organic group, and a represents a number from 1 to 1.8, preferably 1 to 1.5.)

In the average compositional formula (2), the monovalent organic group represented by R is a substituted or unsubstituted hydrocarbon group having preferably 1 to 12, more preferably 1 to 8, carbon atoms. Examples of the organic group include alkyl groups such as a methyl group, an ethyl group, and a propyl group; alkenyl groups such as a vinyl group, an allyl group, and a hexenyl group; aryl groups such as a phenyl group and a tolyl group; organic groups in which some or all of the hydrogen atoms are substituted with a halogen atom or a cyano group, such as a trifluoropropyl group, a chloromethyl group, and a cyanoethyl group; and the like. One of these organic groups may be incorporated alone, or two or more thereof may be incorporated.

Specific preferable examples of the silicone resin shown by the average compositional formula (2) include, for example,
$(MeSiO_{3/2})m$, $(PhSiO_{3/2})m$, $(CF_3C_2H_4SiO_{3/2})m$,
$(MeSiO_{3/2})p(PhSiO_{3/2})q$, $(ViSiO_{3/2})p(PhSiO_{3/2})q$,
$(Me_2SiO)p(PhSiO_{3/2})q$, $(MeViSiO)p(PhSiO_{3/2})q$,
$(Me_3SiO_{1/2})p(SiO_{4/2})q$, $(MeViSiO_{1/2})p(PhSiO_{3/2})q$,
$(MeViSiO)p(CF_3C_2H_4SiO_{3/2})q$, $(MeSiO_{3/2})x(PhSiO_{3/2})y(Ph_2SiO)z$,
$(Me_2ViSiO_{1/2})x(Me_3SiO_{1/2})y(SiO_{4/2})z$
(note that, in the formulas, m, p, q, x, y and z each represent a positive integer; Me represents a methyl group; Ph represents a phenyl group; and Vi represents a vinyl group.) and the like. One of these silicone resins may be used alone, or two or more thereof may be used in combination.

The thermoplastic matrix resin of the component (b) is used to prevent a hydrosilylation reaction by enclosing the platinum-based catalyst during storage at room temperature. Hence, the thermoplastic matrix resin of the component (b) needs to be a solid stable at room temperature. Accordingly, the thermoplastic matrix resin of the component (b) preferably has a melting point or softening point of 40 to 200° C.

With the melting point or softening point of 40° C. or more, the supported platinum catalyst does not diffuse into a thermosetting organopolysiloxane composition, which will be described later, during storage at room temperature, making it possible to prevent curing caused by a hydrosilylation reaction. Moreover, with the inciting point or softening point of 200° C. or less, it is possible to prevent an increase in the temperature when the thermosetting organopolysiloxane composition is cured, so that desired curability can be reliably obtained. Note that the thermoplastic matrix resin of the component (b) has to be one that does not dissolve into the thermosetting organopolysiloxane composition after the preparation.

When used, the resin composition containing supported platinum catalyst is preferably evenly dispersed in the thermosetting organopolysiloxane composition. The resin composition is suitably usable in the form of fine powder or particles. The resin composition has particle sizes of preferably 0.1 μm to 500 μm, more preferably approximately 1 μm to 100 μm. As the method for producing the fine powder or particles of the resin composition containing the supported platinum catalyst, known methods can be employed. Examples thereof include a method using a spray dryer, and the like.

Additionally, the fine powder or particles of the resin composition containing the supported platinum catalyst contains the platinum atom in a range from preferably 0.1 to 5 mass %, more preferably 0.1 to 1 mass %, relative to a total of the components (a) and (b).

The resin composition containing the supported platinum catalyst obtained as described above is used as a catalyst for a hydrosilylation reaction, and can be blended into known addition-reaction curable organopolysiloxane compositions.

[Thermosetting Organopolysiloxane Composition]

A thermosetting organopolysiloxane composition (by addition reaction) of the present invention is a thermosetting organopolysiloxane composition containing components (A) to (C) described below. Specifically, the thermosetting organopolysiloxane composition contains the component (A) of an organopolysiloxane containing an alkenyl group bonded to a silicon atom; and the component (B) of an organohydrogenpolysiloxane containing a hydrogen atom bonded to a silicon atom. Further, the inventive resin composition containing the supported platinum catalyst as a reaction catalyst is used as the component (C), so that the thermosetting organopolysiloxane composition serves as a one-liquid type thermosetting organopolysiloxane composition excellent in long-term storage stability at room temperature.

<Component (A)>

The organopolysiloxane containing an alkenyl group of the component (A) is an organopolysiloxane in which the number of the alkenyl groups bonded to silicon atoms is 0.1 or more per molecule on average. It is preferable to use one shown by the following average compositional formula (3):

$$R^1_b SiO_{(4-b)/2} \qquad (3)$$

(where $R^1$s represent unsubstituted or substituted monovalent hydrocarbon groups identical to or different from each other with 1 to 12, preferably 1 to 10, and more preferably 1 to 8, carbon atoms; and b represents a positive number in a range of 1.5 to 2.8, preferably 1.8 to 2.5, more preferably 1.95 to 2.05, and further preferably 1.98 to 2.01.)

Examples of the alkenyl group bonded to a silicon atom include ones having normally 2 to 8, preferably approximately 2 to 4, carbon atoms: a vinyl group, an allyl group, a propenyl group, an isopropenyl group, a butenyl group, an isobutenyl group, a pentenyl group, a hexenyl group, a cyclohexenyl group, a heptenyl group, and the like. Particularly, a vinyl group is preferable.

In the skeleton of the organopolysiloxane containing the alkenyl group, examples of the position of the silicon atom to which the alkenyl group bonds include terminals of the molecular chain, and/or intermediate portions of the molecular chain (non-terminal area of the molecular chain). The organopolysiloxane is preferably a linear diorganopolysiloxane containing alkenyl groups bonded to at least silicon atoms at both ends of the molecular chain.

Note that the content of the alkenyl group in the component (A) is preferably 0.001 to 10 mol %, particularly preferably approximately 0.01 to 5 mol %, relative to all the monovalent organic groups (i.e., the unsubstituted or substituted monovalent hydrocarbon groups represented by $R^1$ in the average compositional formula (3)) bonded to silicon atoms.

Meanwhile, examples of other organic groups bonded to silicon atoms than the alkenyl group include unsubstituted or halogen-substituted monovalent hydrocarbon groups having normally 1 to 12, preferably approximately 1 to 10, carbon atoms: alkyl groups such as a methyl group, an ethyl group, a propyl group, an isopropyl group, a butyl group, an isobutyl group, a tert-butyl group, a pentyl group, a hexyl group, a cyclohexyl group, and a heptyl group; aryl groups such as a phenyl group, a tolyl group, a xylyl group, and a naphthyl group; aralkyl groups such as a benzyl group and a phenethyl group; halogenated alkyl groups such as a chloromethyl group, a 3-chloropropyl group, and a 3,3,3-trifluoropropyl group; and the like. Particularly, a methyl group and a phenyl group are preferable.

Examples of the molecular structure of the component (A) include linear, cyclic, branched, three-dimensional network (resinous) structures, and the like. The component (A) is preferably a linear diorganopolysiloxane having a backbone basically composed of repeating diorganosiloxane units, and both ends of the molecular chain capped with triorganosiloxy groups (note that this organo group may also include an alkenyl group).

The component has a viscosity at 25° C. of preferably in a range of 100 to 500,000 mPa·s, particularly preferably in a range of 300 to 100,000 mPa·s, because the resulting silicone rubber has favorable physical properties and because the composition is easy to handle and work. Note that, in the present invention, the viscosity can be measured with a rotational viscometer (the same shall apply hereinafter).

Examples of the organopolysiloxane of the component (A) include dimethylsiloxane-methylvinylsiloxane copolymers capped at both ends of the molecular chain with trimethylsiloxy groups, methylvinylpolysiloxane capped at both ends of the molecular chain with trimethylsiloxy groups, dimethylsiloxane-methylvinylsiloxane-methylphehylsiloxane copolymers capped at both ends of the molecular chain with trimethylsiloxy groups, dimethylsiloxane-methylvinylsiloxane-diphenylsiloxane copolymers capped at both ends of the molecular chain with trimethylsiloxy groups, dimethylpolysiloxane capped at one end of the molecular chain with a dimethylvinylsiloxy group and capped at the other end of the molecular chain with a trimethylsiloxy group, dimethylpolysiloxane capped at both ends of the molecular chain with dimethylvinylsiloxy groups, methylvinylpolysiloxane capped at both ends of the molecular chain with dimethylvinylsiloxy groups, dimethylsiloxane-methylvinylsiloxane copolymers capped at both ends of the molecular chain with dimethylvinylsiloxy groups, dimethylsiloxane-methylvinylsiloxane-methylphenylsiloxane copolymers capped at both ends of the molecular chain with dimethylvinylsiloxy groups, dimethylsiloxane-diphenylsiloxane copolymers capped at both ends of the molecular chain with dimethylvinylsiloxy groups, dimethylsiloxane-methylphenylsiloxane copolymers capped at both ends of the molecular chain with dimethylvinylsiloxy groups, dimethylsiloxane-methylvinylsiloxane-diphenylsiloxane copolymers capped at both ends of the molecular chain with dimethylvinylsiloxy groups, dimethylpolysiloxane capped at both ends of the molecular chain with divinylmethylsiloxy groups, dimethylsiloxane-methylvinylsiloxane capped at both ends of the molecular chain with divinylmethylsiloxy groups, dimethylpolysiloxane capped at both ends of the molecular chain with trivinylsiloxy groups, dimethylsiloxane-methylvinylsiloxane copolymers capped at both ends of the molecular chain with trivinylsiloxy groups, organosiloxane copolymers composed of siloxane units shown by the formulas $R^2_3SiO_{0.5}$, $R^2_2R^3SiO_{0.5}$, $R^2_2SiO$, and $SiO_2$, organosiloxane copolymers composed of siloxane units shown by the formulas $R^2_2SiO_{0.5}$ and $SiO_2$, organosiloxane copolymers composed of siloxane units shown by the formulas $R^2_3SiO_{0.5}$, $R^2_2R^3SiO_{0.5}$, and $SiO_2$, organosiloxane copolymers composed of siloxane units shown by the formulas $R^2_2R^3SiO_{0.5}$, $R^2_2SiO$, and $SiO_2$, organosiloxane copolymers composed of siloxane units shown by the formulas $R^2R^3SiO$ and $R^2SiO_{1.5}$ or $R^3SiO_{1.5}$, and mixtures of two or more of these organopolysiloxanes.

In the above formulas, $R^2$ represents an unsubstituted or substituted monovalent hydrocarbon group other than an alkenyl group. Examples of $R^2$ include alkyl groups such as a methyl group, an ethyl group, a propyl group, a butyl group, a pentyl group, a hexyl group, a cyclohexyl group, and a heptyl group; aryl groups such as a phenyl group, a tolyl group, a xylyl group, and a naphthyl group; aralkyl groups such as a benzyl group and a phenethyl group; halogenated alkyl groups such as a chloromethyl group, a 3-chloropropyl group, and a 3,3,3-trifluoropropyl group; and the like. In the formulas, $R^3$ represents an alkenyl group, and examples thereof include ones normally having 2 to 8, preferably approximately 2 to 4, carbon atoms: a vinyl group, an allyl group, a propenyl group, an isopropenyl group, an isobutenyl group, a cyclohexenyl group, a butenyl group, a pentenyl group, a hexenyl group, a heptenyl group, and the like.

One of the organopolysiloxanes containing the alkenyl groups of the component (A) can be used alone, or two or more thereof can be used in combination.

<Component (B)>

The organohydrogenpolysiloxane of the component (B) acts as a crosslinking agent by reacting with the organopolysiloxane of the component (A). The molecular structure is not particularly limited. It is possible to employ various conventionally manufactured structures, for example, linear, cyclic, branched, three-dimensional network (resinous) structures, and the like. Nevertheless, the organohydrogenpolysiloxane of the component (B) has to contain at least two, preferably three or more, hydrogen atoms bonded to silicon atoms (hydrosilyl groups shown by SiH) per molecule. Desirably, the organohydrogenpolysiloxane of the component (B) has normally 2 to 300, preferably 3 to 200, and more preferably approximately 4 to 100, SiH groups.

The organohydrogenpolysiloxane shown by the following average compositional formula (4) can be used.

$$R^4_cH_dSiO_{(4-c-d)/2} \tag{4}$$

In the average compositional formula (4), $R^4$ represents an unsubstituted or substituted monovalent hydrocarbon group bonded to a silicon atom and preferably having 1 to 10 carbon atoms that is free of aliphatic unsaturation. Examples of $R^4$ include alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups such as a phenyl group, a tolyl group, a xylyl group, and a naphthyl group; aralkyl groups such as a benzyl group, a phenylethyl group, and a phenylpropyl group; any of these groups in which some or all of the hydrogen atoms are substituted with halogen atoms such as fluorine, bromine, or chlorine (for example, halogen-substituted alkyl groups such as a chloromethyl group, a chloropropyl group, a bromoethyl group, and a trifluoropropyl group); and the like. $R^4$ is preferably an alkyl group or an aryl group, more preferably a methyl group or a phenyl group. Moreover, c represents a positive number from 0.7 to 2.1, and d represents a positive number from 0.001 to 1.0, where c+d satisfies 0.8 to 3.0. Preferably, c is 1.0 to 2.0, d is 0.01 to 1.0, and c+d is 1.9 to 2.5.

The at least two, preferably three or more, SiH groups contained per molecule may be positioned at the ends of the molecular chain, intermediate portions of the molecular chain, or both the end(s) and the intermediate portion(s). The molecular structure of the organohydrogenpolysiloxane may be any of the linear, cyclic, branched, and three-dimensional network structures. Desirably, the number (or the degree of polymerization) of the silicon atoms per molecule is normally 2 to 300, preferably 3 to 200, and more preferably approximately 4 to 150. The organohydrogenpolysiloxane used has a viscosity at 25° C. of normally 0.1 to 1,000 mPa·s, preferably approximately 0.5 to 500 mPa·s, and is a liquid at room temperature (25° C.).

Such an organonydrogenpolysiloxane includes 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymers, methylhydrogenpolysiloxane capped at both ends of the molecular chain with trimethylsiloxy groups, dimethylsiloxane-methylhydrogensiloxane copolymers capped at both ends of the molecular chain with trimethylsiloxy groups, dimethylsiloxane-methylhydrogensiloxane-methylphenylsiloxane copolymers capped at both ends of the molecular chain with trimethylsiloxy groups, dimethylsiloxane-methylhydrogensiloxane-diphenylsiloxane copolymers capped at both ends of the molecular chain with trimethylsiloxy groups, methylhydrogenpolysiloxane capped at both ends of the molecular chain with dimethylhydrogensiloxy groups, dimethylpolysiloxane capped at both ends of the molecular chain with dimethylhydrogensiloxy groups, dimethylsiloxane-methylhydrogensiloxane copolymers capped at both ends of the molecular chain with dimethylhydrogensiloxy groups, dimethylsiloxane-methylphenylsiloxane copolymers capped at both ends of the molecular chain with dimethylhydrogensiloxy groups, dimethylsiloxane-diphenylsiloxane copolymers capped at both ends of the molecular chain with dimethylhydrogensiloxy groups, methylphenylpolysiloxane capped at both ends of the molecular chain with dimethylhydrogensiloxy groups, diphenylpolysiloxane capped at both ends of the molecular chain with dimethylhydrogensiloxy groups, any of these exemplar compounds in which some or all of the methyl groups are substituted with another alkyl group such as an ethyl group or a propyl group, organosiloxane copolymers composed of siloxane units shown by the formulas $R^4_3SiO_{0.5}$, $R^4_2HSiO_{0.5}$, and $SiO_2$, organosiloxane copolymers composed of siloxane units shown by the formulas $R^4_2HSiO_{0.5}$ and $SiO_2$, organosiloxane copolymers composed of siloxane units shown by the formulas $R^4HSiO$ and $R^4SiO_{1.5}$ or $HSiO_{1.5}$, and mixtures of two or more of these organopolysiloxanes. In the above formulas, $R^4$ represents a monovalent hydrocarbon group other than an alkenyl group. Specific examples of $R^4$ include the same groups as described above.

The organohydrogenpolysiloxane of the component (B) is blended in such an amount that the amount (or the number) of hydrogen atoms bonded to silicon atoms in the organohydrogenpolysiloxane of the component (B) is in a range of preferably 0.4 to 10 mol, particularly preferably 1 to 5 mol, relative to mol (or the number) of the alkenyl groups bonded to silicon atoms in the organopolysiloxane of the component (A) (i.e., a blend ratio of (the number of hydrogen atoms bonded to silicon atoms derived from the component (B))/ (the number of the alkenyl groups bonded to silicon atoms derived from the component (A)) is 0.4 to 10). When the amount of the hydrogen atoms bonded to silicon atoms is 0.4 mol or more relative to 1 mol of the alkenyl groups bonded to silicon atoms, the composition can be cured sufficiently. Meanwhile, when the amount is 10 mol or less, the resulting silicone rubber has sufficient heat resistance.

One of the organohydrogenpolysiloxanes of the component (B) can be used alone, or two or more thereof can be used in combination.

<Component (C)>

The inventive thermosetting organopolysiloxane composition contains the above-described resin composition as the component (C).

Note that, in the present invention, when the resin composition of the component (C) is added to the thermosetting organopolysiloxane composition, the addition amount is a catalytic amount. Preferably, the component (a) contains 1 to 500 ppm, particularly 3 to 50 ppm, of platinum atoms, in terms of weight, in the composition, particularly relative to a total of the component (A) and the component (B).

<Optional Components>

Besides the above components, any regulator compounds conventionally known as compounds having curing inhibition effect against addition reaction catalysts are usable as optional components. Examples of such regulator compounds include phosphorus-containing compounds such as triphenylphosphine; nitrogen-containing compounds such as tributylamine, tetramethylethylenediamine, and benzotriazole; sulfur-containing compounds; acetylene compounds; compounds containing two or more alkenyl groups; hydroperoxy compounds; maleic acid derivatives; and the like. The degree of the curing retarding effect by the regulator compounds greatly varies depending on the chemical structures of the regulator compounds. Accordingly, the amount of the regulator compound added is preferably adjusted to the optimum amount for the individual regulator compound to be used. Adding the regulator compound in the optimum amount makes it possible to obtain long-term storage stability at room temperature and surely prevents curing inhibition.

In addition, examples of other optional components include inorganic fillers such as crystalline silica, hollow fillers, silsesquioxane, fumed titanium dioxide, magnesium oxide, zinc oxide, iron oxide, aluminum hydroxide, magnesium carbonate, calcium carbonate, zinc carbonate, lamellar mica, carbon black, diatomaceous earth, and glass fiber;

fillers obtained by surface-treating the foregoing fillers with an organosilicon compound such as an organoalkoxysilane compound, an organochlorosilane compound, an organosilazane compound, or a low-molecular-weight siloxane compound; and the like. Additionally, the examples also include silicone rubber powders, silicone resin powders, and the like.

Further, the thermosetting organopolysiloxane composition can be blended with, other optional components, for example, a non-crosslinked organopolysiloxane having neither a hydrogen atom nor an alkenyl group bonded to a silicon atom in one molecule, an organic solvent, an anti-creep hardening agent, a plasticizer, a thixotropic agent, a pigment, a dye, an anti-mold agent, and the like.

The present invention also provides a method for curing the inventive thermosetting organopolysiloxane composition as described above. Specifically, the inventive curing method is a curing method including heating the thermosetting organopolysiloxane composition at a temperature not lower than the softening point of the component (b).

EXAMPLES

Hereinafter, the present invention will be specifically described with reference to Synthesis Examples, Examples, and Comparative Examples. However, the present invention is not restricted to Examples described below.

Synthesis Example 1 Preparation of Supported Platinum Catalyst (a-1)

According to the method described in Example 4 of International Publication No. WO2014/142252, a supported platinum catalyst (a-1) (platinum atom content: 1 mass %) shown by the following formula (5) was prepared in which a platinum complex was supported on mesoporous silica MCM-41.

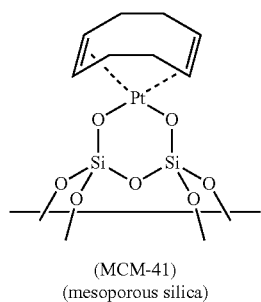

(5)

(MCM-41)
(mesoporous silica)

Synthesis Example 2 Preparation of Supported Platinum Catalyst (a-2)

Instead of MCM-41 in Synthesis Example 1, fumed silica (Aerosil®) 300 manufactured by Nippon Aerosil Co., Ltd.) having a specific surface area of about 300 m²/g measured by the BET method was used to prepare a supported platinum catalyst (a-2) (platinum atom content: 1 mass %) shown by the following formula (6) in which a platinum complex was supported on the fumed silica (Aerosil 300).

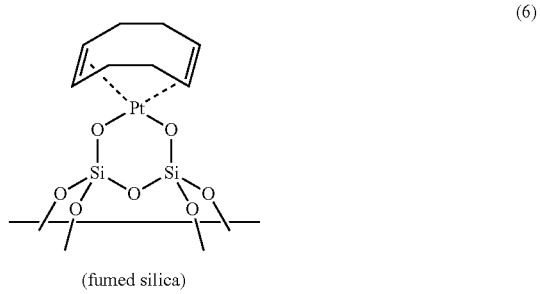

(6)

(fumed silica)

Synthesis Example 3 Preparation of Silicon Resin (b-1)

Toluene (300 g) and water (300 g) were charged, and phenyltrimethoxysilane (139 g, 0.7 mol) and vinylmethyldimethoxysilane (40 g, 0.3 mol) were added dropwise thereto for the hydrolysis reaction. After completion of the dropwise addition, the reaction was allowed to proceed at 50 to 60° C. for 5 hours. After the reaction, the non-volatile content was adjusted by water washing. Thus, as a silicone resin (b-1), 185 g of a toluene solution containing 50 mass % of an organopolysiloxane resin copolymer (silicone resin) was prepared. The silicone resin was composed of $(C_6H_5)SiO_{3/2}$ units and $(CH_2=CH)(CH_3)SiO_{2/2}$ units, the average composition was shown by $(CH_3)_{0.3}(C_6H_5)_{0.7}(CH_2=CH)_{0.3}SiO_{1.35}$, and the alkoxy group content relative to all the functional groups was (5 mol %).

Note that the powder obtained by completely volatilizing the toluene was observed on a hot plate. The result revealed that the softening point was 95° C.

Synthesis Example 4 Preparation of Silicone Resin (b-2)

Toluene (300 g) and water (300 g) were charged, and phenyltrimethoxysilane (139 g, 0.7 mol) and dimethyldimethoxysilane (36 g, 0.3 mol) were added dropwise thereto for the hydrolysis reaction. After completion of the dropwise addition, the reaction was allowed to proceed at 50 to 60° C. for 5 hours. After the reaction, the non-volatile content was adjusted by water washing. Thus, as a silicone resin (b-2), 185 g of a toluene solution containing 50 mass % of an organopolysiloxane resin copolymer (silicone resin) was prepared. The silicone resin was composed of $(C_6H_5)SiO_{3/2}$ units and $(CH_3)_2SiO_{2/2}$, units, the average composition was shown by $(CH_3)_{0.6}(C_6H_5)_{0.7}SiO_{1.35}$, and the alkoxy group content relative to all the functional groups was (5 mol %).

Note that the powder obtained by completely volatilizing the toluene was observed on a hot plate. The result revealed that the softening point was 90° C.

Example 1

Preparation of Resin Composition (Resin Particles) Containing Supported Platinum Catalyst A mixture solution containing 4 g of the supported platinum catalyst (a-2), 8 g of the silicone resin (b-1), and 40 g of toluene was atomized by spray-drying (ejection port temperature: 160° C.) Thus, 8 g of silicone resin particles (I) containing the supported platinum catalyst (average particle size: 10 μm, platinum content: 0.5 mass %) were obtained.

Preparation of Thermosetting Organopolysiloxane Composition

Into a kneader, 60 parts by mass of dimethylpolysiloxane capped at both ends of the molecular chain with vinyldimethylsiloxy groups and having a viscosity at 25° C. of about 10,000 mPa·s 5 parts by mass of hexamethyldisiloxane, 2 parts by mass of water, and 30 parts by mass of fumed silica (Aerosil®) 300 manufactured by Nippon Aerosil Co., Ltd.) having a specific surface area of about 300 m²/g measured by the BET method were charged at room temperature, and mixed for 1 hour to obtain a mixture. This mixture was heated to 150° C. and successively mixed for 2 hours. This mixture was cooled to room temperature. To the mixture, 30 parts by mass of dimethylpolysiloxane capped at both ends of the molecular chain with vinyldimethylsiloxy groups and having a viscosity at 25° C. of about 10,000 mPa·s was added and mixed completely uniformly. Thus, a base compound was obtained.

A thermosetting organopolysiloxane composition was prepared by mixing 50 parts by mass of the obtained base compound with 20 parts by mass of an organopolysiloxane resin (standard polystyrene-equivalent weight-average molecular weight=3,600) composed of 39.5 mol % of $(CH_3)_3SiO_{1/2}$ units, 6.5 mol % of $(CH_3)_2(CH_3)_2(CH_2=CH)SiO_{1/2}$ units, and 54 mol % of $SiO_2$ units in a three-dimensional network, 72 parts by mass of a linear, terminal vinyl group-containing dimethylpolysiloxane polymer having a viscosity at 23° C. of 5,000 mPa·s, 3 parts by mass of a dimethylsiloxane-methylhydrogensiloxane copolymer capped at both ends of the molecular chain with trimethylsiloxy groups and having a viscosity at 23° C. of 6.3 mPa·s (the content of hydrogen atoms bonded to silicon atoms=1.45 mass %), 0.4 parts by mass of the silicone resin particles (I) containing the supported platinum catalyst, 3 parts by mass of an adhesiveness-imparting component shown by the following formula (7), and 0.5 parts by mass of an adhesiveness-imparting component shown by the following formula (8). Table 1 shows the molar ratio of hydrogen atoms bonded to silicon atoms and vinyl groups bonded to silicon atoms (Si—H/vinyl) in the obtained thermosetting organopolysiloxane composition.

(7)

(8)

Example 2

Preparation of Resin Composition (Resin Particles) Containing Supported Platinum Catalyst A mixture solution containing 4 g of the supported platinum catalyst (a-2), 8 g of the silicone resin (b-2), and 40 g of toluene was spray-dried (election port temperature: 70° C.) Thus, 8 g of silicone resin particles (II) containing the supported platinum catalyst (average particle size: 10 μm, platinum content: 0.5 mass %) were obtained.

Preparation of Thermosetting Organopolysiloxane Composition

A thermosetting organopolysiloxane composition was prepared in accordance with Example 1, except that the silicone resin particles (II) containing the supported platinum catalyst were used instead of the silicone resin particles (I) containing the supported platinum catalyst. Table 1 shows the molar ratio of hydrogen atoms bonded to silicon atoms and vinyl groups bonded to silicon atoms (Si—H/vinyl) in the obtained thermosetting organopolysiloxane composition.

Example 3

Preparation of Resin Composition (Resin Particles) Containing Supported Platinum Catalyst A mixture solution containing 4 g of the supported platinum catalyst (a-1), 8 g of the silicone resin (b-1), and 40 g of toluene was spray-dried (election port temperature: 70° C.). Thus, 8 g of silicone resin particles (III) containing the supported platinum catalyst (average particle size: 10 μm, platinum content: 0.5 mass %) were obtained.

Preparation of Thermosetting Organopolysiloxane Composition

A thermosetting organopolysiloxane composition was prepared in accordance with Example 1, except that the silicone resin particles (III) containing the supported platinum catalyst were used instead of the silicone resin particles (I) containing the supported platinum catalyst. Table 1 shows the molar ratio of hydrogen atoms bonded to silicon atoms and vinyl groups bonded to silicon atoms (Si—H/vinyl) in the obtained thermosetting organopolysiloxane composition.

Comparative Example 1

Preparation of Thermosetting Organopolysiloxane Composition

A thermosetting organopolysiloxane composition was prepared in accordance with Example 1, except that 0.2 parts by mass of the supported platinum catalyst (a-2) and 0.75 parts by mass of triallylisocyanurate were used instead of the silicone resin particles (I) containing the supported platinum catalyst. Table 1 shows the molar ratio of hydrogen atoms bonded to silicon atoms and vinyl groups bonded to silicon atoms (Si—H/vinyl) in the obtained thermosetting organopolysiloxane composition.

Evaluation of Thermosetting Organopolysiloxane Compositions

The thermosetting organopolysiloxane compositions obtained in Examples 1 to 3 and Comparative Example 1 were cured at 150° C., and the times when the curing started were measured. Moreover, the compositions were cured at 120° C. for 1 hour, and subjected to tests for measuring hardness, tensile strength, elongation at break, and shearing adhesive force using aluminum as adherends in accordance with JIS K 6249. Further, the compositions were stored at 50° C., and the change in viscosity was measured to evaluate the storability as a one-liquid type composition. Table 1 shows these results.

TABLE 1

|  |  | Example 1 | Example 2 | Example 3 | Comparative Example 1 |
|---|---|---|---|---|---|
| Si—H/vinyl (molar ratio) | | 1.8 | 1.8 | 1.8 | 1.8 |
| Curing starting time (min.) at 150° C. | | 3 | 3 | 3 | 3 |
| Hardness durometer type A | | 35 | 35 | 35 | 35 |
| Tensile strength (MPa) | | 2.2 | 2.0 | 2.1 | 2.2 |
| Elongation at break (%) | | 200 | 220 | 180 | 200 |
| Shearing adhesive force (MPa), 2 mm thickness (cohesive failure %) | | 2.3 (100%) | 2.0 (100%) | 2.3 (100%) | 1.8 (100%) |
| 50° C. thickening test | initial viscosity (Pa·s) | 20 | 20 | 19 | 36 |
| | viscosity after 2 weeks at 50° C. | 26 | 28 | 25 | gelled |
| | viscosity after 3 weeks at 50° C. | 28 | 30 | 27 | |
| | viscosity after 6 weeks at 50° C. | 32 | 34 | 31 | |
| | viscosity after 12 weeks at 50° C. | 41 | 45 | 40 | |

As shown in Table 1, there was no difference in the time when the curing started between Examples 1 to 3, which are the thermosetting organopolysiloxane compositions containing the resin compositions of the present invention, and Comparative Example 1. Meanwhile, it was revealed that sufficiently favorable hardness, tensile strength, elongation at break, and shearing adhesive force were successfully imparted to the cured products in Examples 1 to 3. Further, when the thermosetting organopolysiloxane compositions were stored at 50° C., the compositions were not cured even after 12 weeks. This revealed that the storability was excellent.

On the other hand, in Comparative Example 1, when the thermosetting organopolysiloxane composition was stored at 50° C., a gel was formed after 2 weeks, revealing that the storability was poor.

Example 4

Preparation and Evaluation of Thermosetting Organopolysiloxane Composition

A thermosetting organopolysiloxane composition was prepared by mixing 100 parts by mass of dimethylpolysiloxane having the molecular ends composed of 0.6 dimethylvinylsiloxy groups on average and 1.4 trimethylsiloxy groups on average and having a viscosity of about 800 mPa·s with 0.9 parts by mass of a dimethylsiloxane methylhydrogensiloxane copolymer capped at both ends of the molecular chain with trimethylsiloxy groups and having a viscosity at 23° C. of 100 mPa·s (the content of hydrogen atoms bonded to silicon atoms=0.5 mass %) and 0.1 parts by mass of the silicone resin particles (I) containing the supported platinum catalyst. Table 2 shows the molar ratio of hydrogen atoms bonded to silicon atoms and vinyl groups bonded to silicon atoms (Si—H/vinyl) in the obtained thermosetting organopolysiloxane composition.

The obtained thermosetting organopolysiloxane composition was cured at 150° C., and the time when the curing started was measured. Moreover, the composition was cured at 150° C. for 1 hour, and subjected to the test method for cone penetration (one-quarter scale cone) in JIS K 2220. The penetration score thus measured was 65. Further, the thermosetting organopolysiloxane composition was stored at 50° C., and the change in viscosity was measured to evaluate the storability as a one-liquid type composition. Table 2 shows the results.

Comparative Example 2

Preparation and Evaluation of Thermosetting Organopolysiloxane Composition

A thermosetting organopolysiloxane composition was prepared in accordance with Example 4, except that 0.05 parts by mass of the supported platinum catalyst (a-2) was used instead of the silicone resin particles (I) containing the supported platinum catalyst. Table 2 shows the molar ratio of hydrogen atoms bonded to silicon atoms and vinyl groups bonded to silicon atoms (Si—H/vinyl) in the obtained thermosetting organopolysiloxane composition.

The obtained thermosetting organopolysiloxane composition was cured at 150° C., and the time when the curing started was measured. Moreover, the composition was cured at 150° C. for 1 hour, and subjected to the test method for cone penetration (one-quarter scale cone) in JIS K 2220. The penetration score thus measured was 63. Further, the thermosetting organopolysiloxane composition was stored at 50° C., and the change in viscosity was measured to evaluate the storability as a one-liquid type composition. Table 2 shows the results.

TABLE 2

|  |  | Example 4 | Comparative Example 2 |
|---|---|---|---|
| Si—H/vinyl (molar ratio) | | 1.1 | 1.1 |
| Curing starting time (min.) at 150° C. | | 2 | 2 |
| 50° C. thickening test | initial viscosity (Pa·s) | 820 | 780 |
| | viscosity after 2 weeks at 50° C. | 830 | gelled |
| | viscosity after 3 weeks at 50° C. | 840 | |
| | viscosity after 6 weeks at 50° C. | 900 | |
| | viscosity after 12 weeks at 50° C. | 950 | |

As shown in Table 2, there vas no difference in the time when the curing started between Example 4, which is the thermosetting organopolysiloxane composition containing the resin composition of the present invention, and Comparative Example 2. Meanwhile, when the thermosetting organopolysiloxane composition of Example 4 was stored at 50° C., the composition was not cured even after 12 weeks. This revealed that the storability was excellent.

On the other hand, in Comparative Example 2, when the thermosetting organopolysiloxane composition was stored at 50° C., a gel was formed after 2 weeks, revealing that the storability was poor.

It should be noted that the present invention is not restricted to the above-described embodiments. The embodiments are merely examples so that any embodiments that have substantially the same feature and demonstrate the same functions and effects as those in the technical concept as disclosed in claims of the present invention are included in the technical range of the present invention.

The invention claimed is:

1. A resin composition comprising:
   (a) a supported platinum catalyst having a structure shown by the following general formula (1) in which a platinum complex is supported on a surface of an inorganic oxide; and
   (b) a thermoplastic matrix resin,

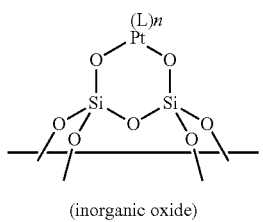

(inorganic oxide) (1)

wherein L represents a ligand selected from carbon monoxide, an olefin compound, an amine compound, a phosphine compound, an N-heterocyclic carbene compound, a nitrile compound, and an isocyanide compound; and n represents the number of Ls and an integer from 0 to 2.

2. The resin composition according to claim 1, wherein the inorganic oxide is silica or a composite oxide containing silicon.

3. The resin composition according to claim 2, wherein the component (b) has a softening point of 40 to 200° C.

4. The resin composition according to claim 3, wherein the component (b) is a silicone resin shown by the following average compositional formula (2):

$$R_a SiO_{(4-a)/2} \quad (2)$$

wherein R represents a monovalent organic group, and a represents a number from 1 to 1.8.

5. The resin composition according to claim 2, wherein the component (b) is a silicone resin shown by the following average compositional formula (2):

$$R_a SiO_{(4-a)/2} \quad (2)$$

wherein R represents a monovalent organic group, and a represents a number from 1 to 1.8.

6. The resin composition according to claim 1, wherein L in the general formula (1) is cyclooctadiene.

7. The resin composition according to claim 6, wherein the component (b) has a softening point of 40 to 200° C.

8. The resin composition according to claim 7, wherein the component (b) is a silicone resin shown by the following average compositional formula (2):

$$R_a SiO_{(4-a)/2} \quad (2)$$

wherein R represents a monovalent organic group, and a represents a number from 1 to 1.8.

9. The resin composition according to claim 6, wherein the component (b) is a silicone resin shown by the following average compositional formula (2):

$$R_a SiO_{(4-a)/2} \quad (2)$$

wherein R represents a monovalent organic group, and a represents a number from 1 to 1.8.

10. The resin composition according to claim 2, wherein L in the general formula (1) is cyclooctadiene.

11. The resin composition according to claim 10, wherein the component (b) has a softening point of 40 to 200° C.

12. The resin composition according to claim 11, wherein the component (b) is a silicone resin shown by the following average compositional formula (2):

$$R_a SiO_{(4-a)/2} \quad (2)$$

wherein R represents a monovalent organic group, and a represents a number from 1 to 1.8.

13. The resin composition according to claim 10, wherein the component (b) is a silicone resin shown by the following average compositional formula (2):

$$R_a SiO_{(4-a)/2} \quad (2)$$

wherein R represents a monovalent organic group, and a represents a number from 1 to 1.8.

14. The resin composition according to claim 1, wherein the component (b) has a softening point of 40 to 200° C.

15. The resin composition according to claim 14, wherein the component (b) is a silicone resin shown by the following average compositional formula (2):

$$R_a SiO_{(4-a)/2} \quad (2)$$

wherein R represents a monovalent organic group, and a represents a number from 1 to 1.8.

16. The resin composition according to claim 1, wherein the component (b) is a silicone resin shown by the following average compositional formula (2):

$$R_a SiO_{(4-a)/2} \quad (2)$$

wherein R represents a monovalent organic group, and a represents a number from 1 to 1.8.

17. The resin composition according to claim 1, wherein the resin composition is particulate with particle sizes of 0.1 μm to 500 μm.

18. A thermosetting organopolysiloxane composition comprising:
   (A) an organopolysiloxane containing an alkenyl group bonded to a silicon atom, wherein the number of the alkenyl groups is 0.1 or more per molecule on average;
   (B) an organohydrogenpolysiloxane containing at least two hydrogen atoms bonded to silicon atoms per molecule, wherein a blend ratio of (the number of hydrogen atoms bonded to silicon atoms derived from the component (B))/(the number of the alkenyl groups bonded to silicon atoms derived from the component (A)) is 0.4 to 10; and
   (C) the resin composition according to claim 1, wherein the component (a) contains 1 to 500 ppm of platinum atoms, in terms of weight, relative to a total of the component (A) and the component (B).

19. A method for curing the thermosetting organopolysiloxane composition according to claim 18, the method comprising heating the thermosetting organopolysiloxane composition at a temperature not lower than the softening point of the component (b).

* * * * *